United States Patent [19]

Terada et al.

[11] Patent Number: 5,276,541
[45] Date of Patent: Jan. 4, 1994

[54] METHOD FOR FORMING A LIQUID CRYSTAL DISPLAY WITH A SEALING MEMBER

[75] Inventors: Kenji Terada, Moriyama; Masato Shoji, Yokohama, both of Japan

[73] Assignee: International Business Machines Corporation, Armonk, N.Y.

[21] Appl. No.: 670,098

[22] Filed: Mar. 15, 1991

Related U.S. Application Data

[62] Division of Ser. No. 525,508, May 18, 1990, abandoned.

[30] Foreign Application Priority Data

May 19, 1989 [JP] Japan ................. 1-12613

[51] Int. Cl.$^5$ .................................................. G02F 1/13
[52] U.S. Cl. ........................................ 359/80; 359/81; 359/83; 359/88; 430/20
[58] Field of Search .............. 350/334, 343, 344; 427/108, 164, 165; 428/1; 430/20; 359/36, 80, 81, 83, 88

[56] References Cited

U.S. PATENT DOCUMENTS

| | | | |
|---|---|---|---|
| 4,443,063 | 4/1984 | Nishiyama | 350/334 |
| 4,610,510 | 9/1986 | Funada et al. | 350/334 |
| 4,640,583 | 2/1987 | Hoshikawa et al. | 350/343 |
| 4,645,306 | 2/1987 | Akai | 350/343 |
| 4,820,025 | 4/1989 | Nakanowatari | 350/334 |
| 4,924,243 | 5/1990 | Sato et al. | 350/350 S |

FOREIGN PATENT DOCUMENTS

| | | | |
|---|---|---|---|
| 52-69647 | 6/1977 | Japan | 350/343 |
| 57-17923 | 1/1982 | Japan | 350/343 |
| 57-70515 | 5/1982 | Japan | 350/334 |
| 60-66234 | 4/1985 | Japan | 350/334 |
| 60-179722 | 9/1985 | Japan | 350/343 |
| 61-177436 | 8/1986 | Japan | 350/334 |
| 1-200228 | 8/1989 | Japan | 350/343 |

Primary Examiner—William Mintel
Assistant Examiner—Minhloan Tran
Attorney, Agent, or Firm—Robert M. Trepp

[57] ABSTRACT

A method for forming a liquid crystal display incorporating a first substrate having switching elements and electrodes connected to the elements, a second substrate, a sealing member, and a liquid crystal material wherein during manufacturing the electrodes are grounded to the device for forming the sealing member and then the sealing member is formed on the first substrate.

3 Claims, 7 Drawing Sheets

METHOD FOR FORMING A LIQUID CRYSTAL DISPLAY WITH A SEALING MEMBER

This is a continuation of application Ser. No. 07/525,508, filed May 18, 1990, now abandoned.

BACKGROUND OF THE INVENTION

1. Field of the Invention

This invention relates to a liquid crystal display and more particularly to injecting liquid crystal material and sealing while preventing damage to transistors, etc. from static electricity in an active matrix type liquid crystal display.

2. Description of the Prior Art

For the past several years, liquid crystal displays have been growing in use, for example, in word processors, televisions, etc., as a display means suitable for smaller size and lighter weight devices.

Recently, the display in these instruments has a great demand for larger picture and higher picture quality, and demands for commercialization of the active matrix type liquid crystal display, in which a larger area and higher density are possible are increasing.

However, since such active matrix type liquid crystal displays of larger area and higher density are being researched and developed based on the conventional small-sized low-density liquid crystal display, various problems are caused by these differences.

Problems in manufacturing are shown below as examples.

Figure 8:
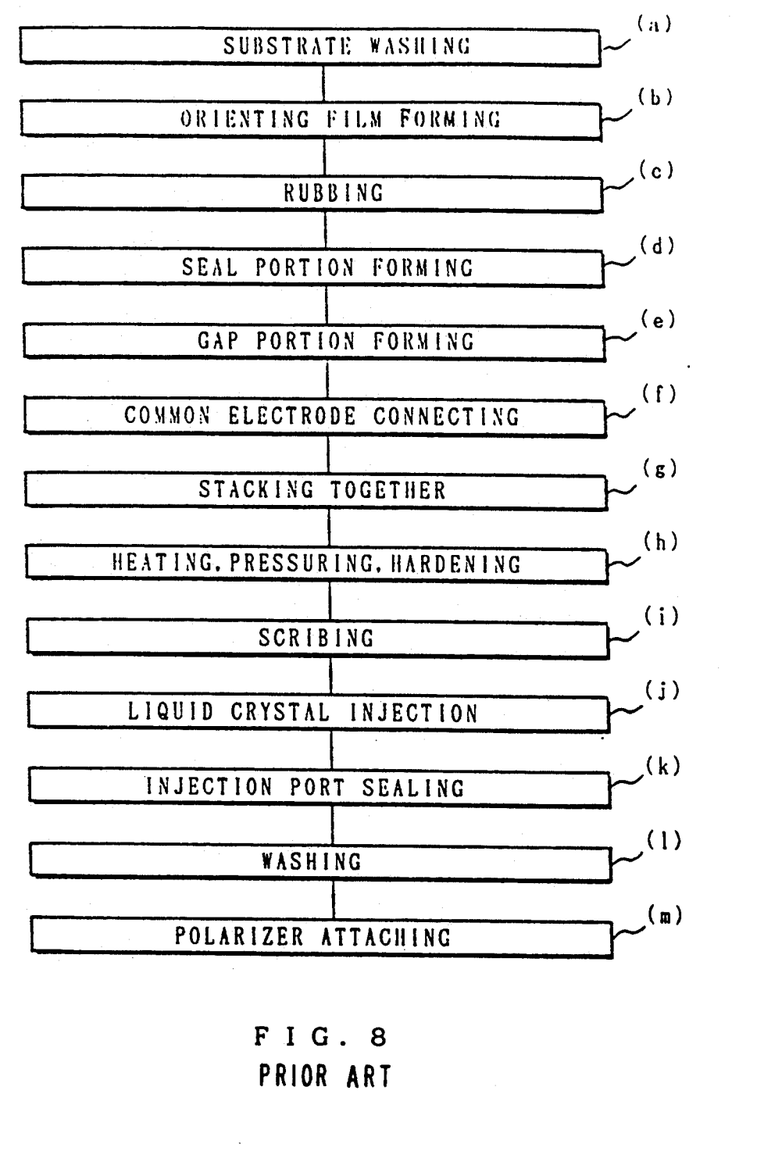
FIG. 8 is a diagram illustrating a manufacturing process of a liquid cell in the conventional active matrix type liquid crystal display of the prior art.

FIG. 8 is a manufacturing process diagram of the prior art of a liquid crystal cell of a conventional active matrix type liquid crystal display. A manufacturing process will be described with reference to FIG. 8 which shows steps a through m.

First, in step a, two glass substrates for composing the active matrix liquid crystal display are washed.

Then, in step b, a molecule-orienting film is formed on each of the glass substrates, and in step c, an orientation treatment such as a rubbing method is applied on the surfaces.

Then, in steps d and e, a gap potion and a sealing portion to seal liquid crystal material and formed, and in step f, a glass substrate with an electrode provided for every picture element thereof, and a glass substrate provided with a transparent electrode on one surface, are connected through a common electrode.

These two glass substrates are stacked together, in step g, and in step h are heated and pressurized under specified conditions to harden the sealing portion.

Figure 9:
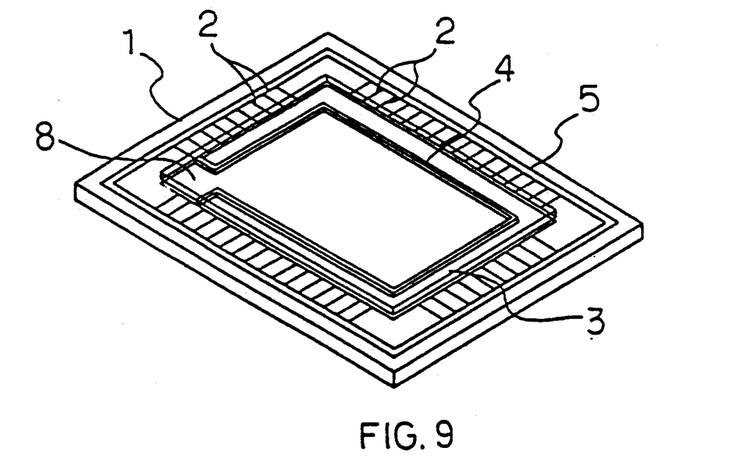
FIG. 9 is a perspective view showing a state of half-finished product which has been processed through the predetermined step of FIG. 6.

FIG. 9 shows a half-finished product which has been processed through such steps a to h.

In FIG. 9, 1 designates a glass substrate with many electrodes 2 formed vertically and horizontally, and 3 designates a glass substrate with a transparent electrode formed thereon. Reference numeral 4 represents a sealing section and 5 represents a shorting ring. The shorting ring 5 shorts signal portions and gate portions of switching transistors formed on the glass substrate 1 to prevent the switching transistors from being damped by static electricity produced in each of the above manufacturing steps.

Figure 10:
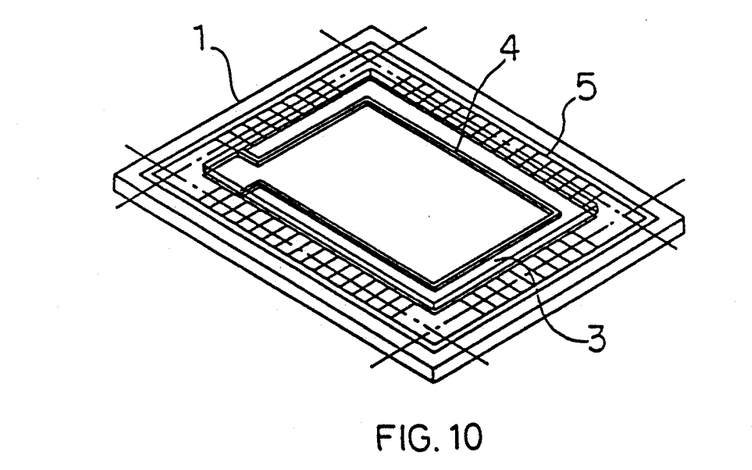
FIG. 10 is a diagram for illustrating a scribing process.

As shown by broken lines in FIG. 10, the shorting ring 5 connected to an outer edge portion of the glass substrate 1 is cut off together with the outer edge portion of the glass substrate 1 itself. This step is called a scribing step and is shown as step i in FIG. 8.

Figure 11:
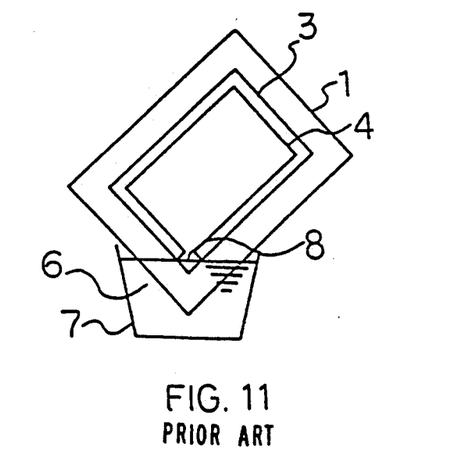
FIG. 11 is a diagram for illustrating a perpendicular injection method of liquid crystal material during manufacturing of the liquid crystal cell of the prior art.

Then, as shown in FIG. 11, glass substrate 1 and 3 are placed nearly perpendicularly to the liquid crystal surface in a boat 7, where a liquid crystal material 6 accumulates. Liquid crystal injection port 8, provided at the corner of the glass substrates 1 and 3 stacked together, is immersed to inject the liquid crystal material into the space between the glass substrates 1, 3 as shown as step j in FIG. 8.

After the liquid injection port 8 has been sealed in step k, this part is washed shown in FIG. 8 as step 1, and finally a polarizer is attached as shown in FIG. 8, step m.

Figure 12:
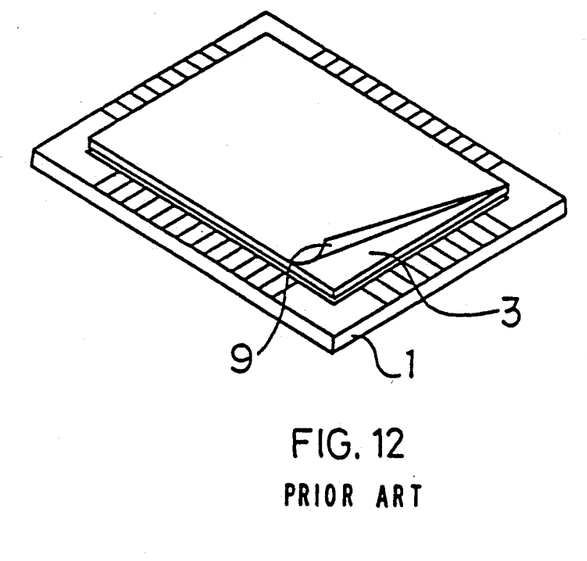
FIG. 12 is a diagram for illustrating a step of peeling off a protective film from a polarizer.

In such a manufacturing process, shorting ring 5 is intentionally used to prevent the switching transistors from being damaged due to the static electricity. However, before injection of the liquid crystal material, it is necessary, for facilitating the immersion of the substrate into the boat 7 by decreasing the area of glass substrate 1 and for removing the corner section of the glass substrate which is heavily stained, to scribe the glass substrate in the position where the shorting ring is connected. That is, in the steps after scribing step i, the shorting ring is removed and the signal portions and the gate portion of the switching transistors become insulated. For this reason, in the steps thereafter (step (j) and after), if static electricity is produced, the switching transistors can be damaged. For example, a polarizer has a protective film attached to its surface before being attached to the substrate, but the protective film 9, shown in FIG. 12, must be peeled off after the polarizer has been attached in step m of FIG. 8. This can produce a large quantity of static electricity which may cause the switching transistors to be defective. In such a manufacturing process, in step j the liquid crystal material is injected by a so-called perpendicular method. Because when liquid crystal injection port 8 is immersed, not only liquid crystal injection port 8, but also the whole corner section of glass substrates 1 and 3 around port 8 are immersed, the oil, dust, etc. attached to the corner section of glass substrates 1 and 3 are dissolved in the liquid crystal material accumulated in boat 7, and liquid crystal material 6 becomes gradually contaminated and deteriorates with use. Therefore liquid crystal material 6 must be replaced after being used to some degree. In addition, since the whole corner section of glass substrates 1 and 3 is immersed in liquid crystal material 6, some part of liquid crystal material 6, instead of being injected into the space between the glass substrates through liquid crystal injection port 8, sticks to the surface of the corner section of glass substrates 1 and 3. Thus, in such a manufacturing process, a large quantity of liquid crystal material 6 is lost by contamination, deterioration, or sticking to useless portions of glass substrates 1 and 3.

Manufacturing such a large-area and high-density active matrix type liquid crystal display by the conventional method produces static electricity that can damage the switching transistors. In addition, there is a problem of a large quantity of liquid crystal material being lost uselessly by contamination and deterioration or sticking to the useless sections.

SUMMARY OF THE INVENTION

In accordance with this invention, a liquid crystal display comprises a liquid layer positioned between a first substrate and second substrate that face each other and are sealed with a sealing member, and a liquid crystal pool composed of an extension part of the sealing member. The extension part is formed on the region of the first substrate not covered by the second substrate. The liquid crystal pool is continued on the liquid crystal layer.

The substrate whose area is larger than the area of the other substrate is preferably for the substrate on which the liquid crystal pool is formed. Generally, in an active matrix liquid crystal display, a so-called array substrate having switching elements such as thin film transistors has larger area than the opposing substrate, due to the necessity to form electrodes for connection with external signal lines or control lines. When forming a sealing member on such an array substrate, it is necessary to prevent the switching elements from being damaged.

Therefore, in accordance with this invention, a conductive member (e.g. the above shorting ring) shorting electrodes connected to the switching elements of the array substrate are electrically connected with a grounding portion (e.g. printing stage) of a device forming the seal member (e.g. screen printer), and then the seal member is formed.

In accordance with this invention, the injection of liquid crystal material can be made by a horizontal method by use of the liquid crystal pool provided on the first substrate. Therefore, the causality between the liquid crystal injection step and the scribing step can be eliminated and the scribing process can be made the final step. Thus, damage of the switching transistors can be prevented. Also, the injection of liquid crystal material can be effected by accumulating the necessary quantity of liquid crystal material in the liquid crystal pool. Thus, the contamination of liquid crystal, deterioration due to the vertical injection system is completely eliminated and sticking of the liquid crystal to a useless position is eliminated and useless loss of liquid crystal material can be prevented.

It is an object of this invention to provide a liquid crystal display and a manufacturing method thereof which can protect switching transistors from damage due to static electricity and which prevents useless loss of liquid crystal material.

DESCRIPTION OF THE PREFERRED EMBODIMENT

Figure 1:
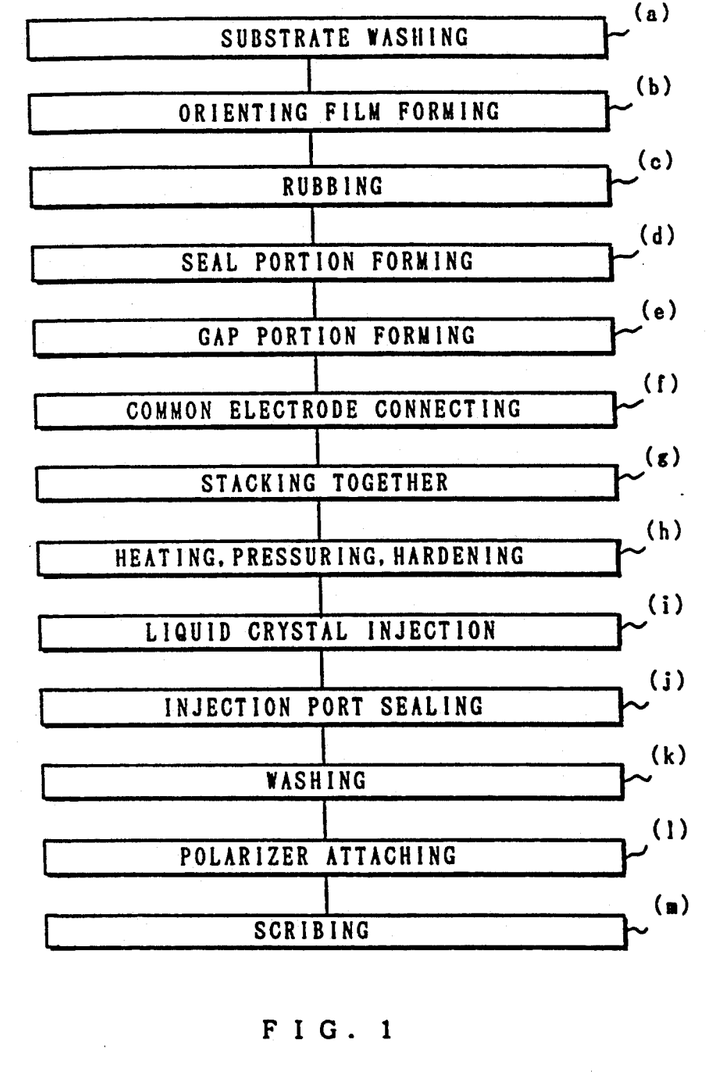
FIG. 1 is a diagram showing a manufacturing process of a liquid crystal cell of a large-area high-density active matrix type liquid crystal display in accordance with an embodiment of the invention.

Referring now to the drawing, FIG. 1 is a diagram showing the steps of a manufacturing process of a liquid crystal cell of a larger-area and high-density active matrix type liquid crystal display in accordance with an embodiment of this invention.

Two glass substrates for an active matrix are prepared for constituting the liquid crystal display. On one surface of the glass substrate of large area (called an array substrate), a number of electrodes are provided vertically and horizontally, and at each intersection a switching transistor such as a thin-film transistor is formed. On one surface of another glass substrate of smaller area (called opposite substrate) a transparent common electrode is formed.

The array substrate and the opposite substrate are first cleaned in step a.

Then, on the array substrate and the opposite substrate, molecule orienting films are formed in step b and on their surfaces, an orientation treatment such as a rubbing method is applied as step c.

Figure 2:
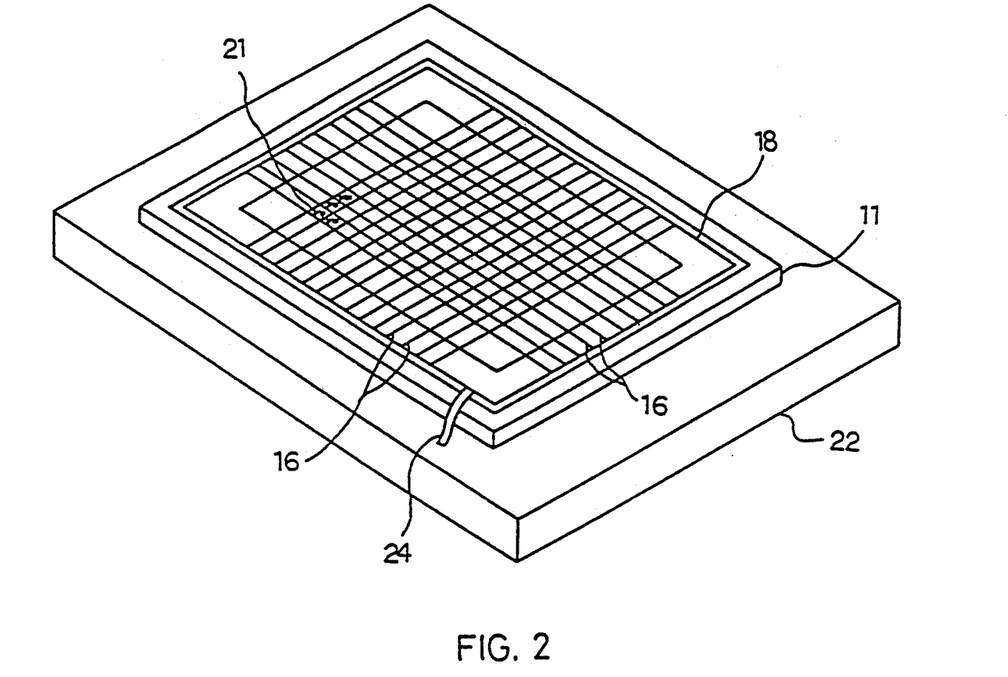
FIG. 2 is a perspective view showing a connection of an array substrate and a printing stage when a sealing member is formed by use of a screen printer.

Then, on the electrode forming surface of the array substrate are formed a gap portion and a sealing portion for sealing a liquid crystal material with a sealing member, steps d and e. To form the sealing member, an array substrate 11 having many switching transistors 21 and electrodes 16 connected to these switching transistors 21, as shown in FIG. 2, is fixed to a printing stage 22 of a screen printer. To short signal portions and gate portions of the switching transistors 21, a shorting ring 18 which shorts the electrodes 16 is shorted to the printing stage 22 through a conductor 24. This leads to the shorting of a grounding portion of the screen printer to the electrodes 16.

Figure 3:
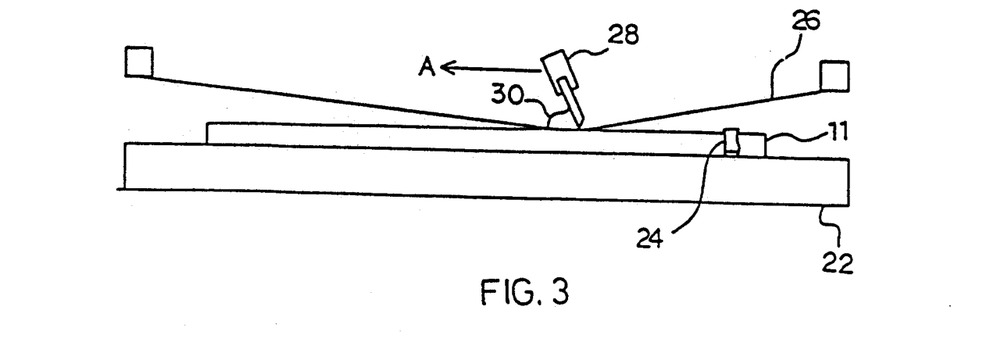
FIG. 3 is a side view showing a mode of forming the sealing member using the screen printer.

As shown in FIG. 3, when a sealing agent on a screen 26 having a pattern for printing corresponding to the configuration of the sealing member including the pool described later is squeezed in the direction of arrow A with a squeegee 28, the sealing agent is printed on the array substrate 11. When the squeegee 28 moves, the screen 26 contacts the array substrate 11, and static electricity is produced by it. However, shorting ring 18 shorted to the printing stage 22 through conductor 24 as described above, can pass the static electricity to the grounding portion of the screen printer and protect switching transistors 21 from being damaged.

Figure 4:
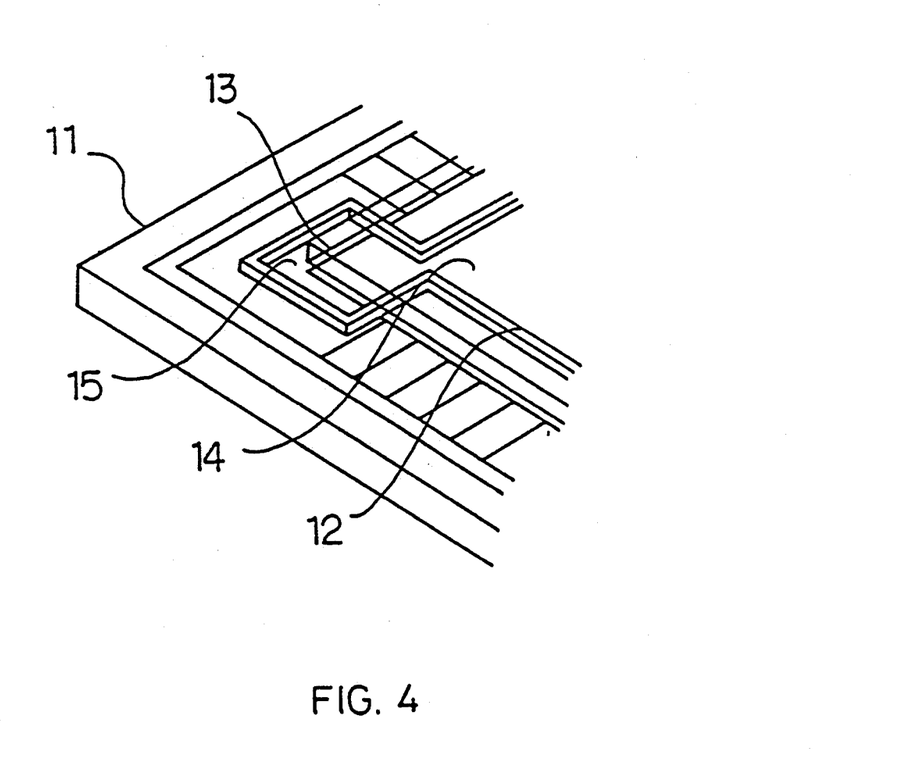
FIG. 4 is an enlarged perspective view of a liquid crystal pool and its vicinity in accordance with the embodiment of the invention.

By such screen printing, a liquid crystal pool 15 comprising an extension part of the sealing member of a sealing part 12 and being continued on the inside 14 of the sealing part 12 through the liquid crystal injection port 13 is formed on a corner region of the array substrate 11 not covered by the opposite substrate 17, as shown in FIG. 4.

The array substrate and the opposite substrate are then connected through a common electrode in step f.

Figure 5:
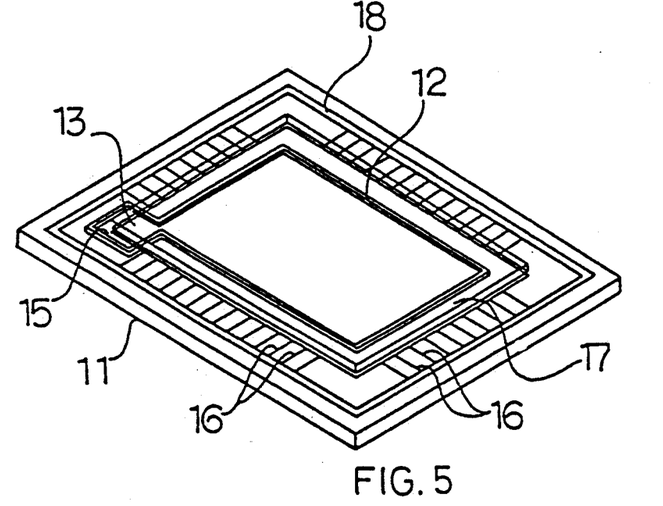
FIG. 5 is a perspective view showing a state of half-finished product of the active matrix type liquid crystal display in accordance with the embodiment of the invention.

Then, the array substrate and the opposite substrate are stacked together in step g, and the sealing member is hardened by heating and pressurizing in step h. FIG. 5 shows the state of a half-finished product which has been processed through such steps.

Figure 6:
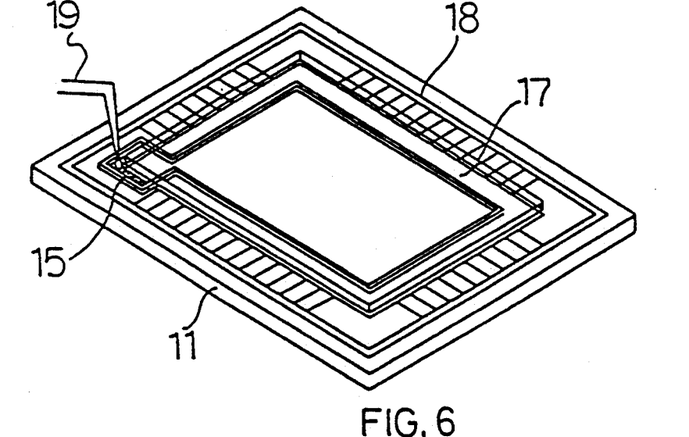
FIG. 6 is a perspective view for illustrating a horizontal injection method of liquid crystal material during manufacturing in accordance with the embodiment of the invention.

The half-finished product shown in FIG. 5 is injected with liquid crystal material 19 into the space between the array substrate 11 and opposite substrate 17 in step i, by placing the half-finished product in a vacuum circumstance, accumulating liquid crystal material in the liquid crystal pool 15, and then restoring the half-finished product in atmospheric pressure, utilizing the pressure difference and osmotic pressure, as shown in FIG. 6.

Then, after sealing the liquid crystal injection port 13 in step j, this part is washed in step k.

After step k, a polarizer is attached, and a protective film attached to the surface of the polarizer is peeled off, step l.

Finally, a so-called scribing is made where the short ring 18 connected to an outer edge portion of the array substrate 11 is cut off together with the outer edge portion of the array substrate 11 itself, step m.

Figure 7:
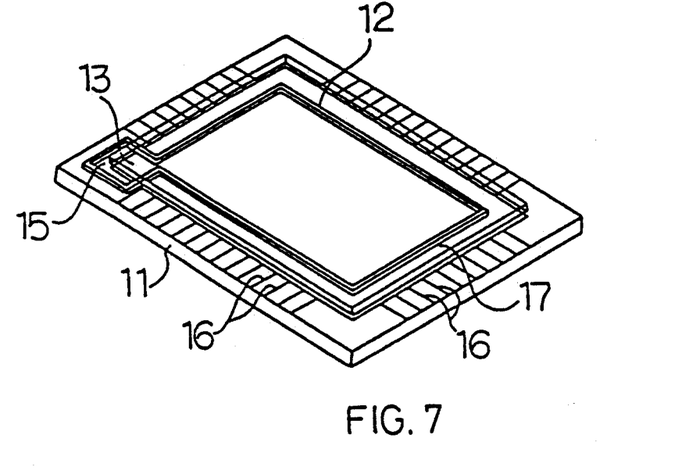
FIG. 7 is a perspective view showing the appearance of a liquid crystal cell in the liquid crystal display in accordance with the embodiment of the invention.

FIG. 7 shows the appearance of the liquid crystal cell of the liquid crystal display manufactured by such a process, steps a-m of FIG. 1.

In accordance with the above embodiment, since the liquid crystal material 19 is injected by a horizontal method using the liquid crystal pool 15 provided on the array substrate 11, the conventional restriction, wherein the scribing step must be made before the liquid crystal injection is eliminated. Thus, the scribing can be made in the final step and the switching transistors can be protected from being damaged by the static electricity produced, for example, when the protective film is peeled off from the polarizer. Thus, the yield of the product is increased and the manufacturing cost is reduced.

The injection of liquid crystal material 19, which can be effected by accumulating a sufficient quantity of liquid crystal 19 in the liquid crystal pool, is quite free from the contamination and deterioration of the liquid crystal material caused by the perpendicular injection method used so far. The sticking of liquid crystal material to useless parts is eliminated, and useless use of the liquid crystal material 19 is prevented.

Since the liquid crystal pool 15 comprises an extension part of the sealing member of the sealing part 12 and is formed simultaneously with the formation of the sealing part, the formation of the liquid crystal pool 15 has little influence on the manufacturing cost.

This invention is not limited to the embodiment described above.

For example, the drawing shows a rectangular configuration of the liquid crystal pool, but a circular or other configuration is also possible. Any one is satisfactory if it can accumulate the liquid crystal material to some extent.

In the above embodiment, the array substrate is of large area and the opposite substrate is of small area, but this invention is not limited to these. It is enough that the position where the liquid crystal pool is formed is exposed so that the liquid crystal material can be accumulated. In other words, a portion of the opposite substrate in the position corresponding to the liquid crystal pool being removed or the opposite substrate being shifted so that the position is exposed may also be possible.

In the above embodiment, a large-area and high-density active matrix type liquid crystal display was intended for, but this invention can be naturally applied to the other type of liquid crystal display.

Further, in the above embodiment, a screen printer is used as the device for forming the sealing member, but this invention is not limited to this. This invention can use any seal forming device as long as it can pass the static electricity produced during seal forming to the grounding part of the seal forming device by shorting the electrode of the array substrate to it.

It is to be understood that the invention can be modified variously without departing from the spirit of the invention.

In accordance with this invention, as described above, since the scribing process can be made in the last step, the switching transistors can be prevented from being damaged due to the production of static electricity. In addition, since the injection of liquid crystal material can be effected by accumulating a necessary and sufficient amount of liquid crystal material in the liquid crystal pool, it is completely free from contamination and deterioration of the liquid crystal material caused by the perpendicular injection method. The sticking of the liquid crystal material to useless parts is eliminated and useless use of the liquid crystal material is prevented.

Having thus described our invention, what we claim as new and desire to secure by Letters Patents is:

1. A method for manufacturing a liquid crystal display in which a space between a first substrate having switching elements and electrodes connected to the elements and a second substrate facing the first substrate is sealed with a sealing member, and then a liquid crystal material is injected into said space, comprising the steps of:

electrically connecting said electrodes of said first substrate to a grounding portion of a device used for forming said sealing member; and forming said sealing member on said first substrate with said device.

2. A method of manufacturing a liquid crystal display as claimed in claim 1, wherein said device for forming said sealing member is a screen printer.

3. A method of manufacturing a liquid crystal display as claimed in claim 2, wherein said electrodes of said first substrate are short-circuited with a printing stage of said screen printer.

* * * * *